United States Patent [19]

Davies et al.

[11] 4,291,766
[45] Sep. 29, 1981

[54] PROCESS FOR CONSOLIDATING WATER-WET SANDS WITH AN EPOXY RESIN-FORMING SOLUTION

[75] Inventors: David R. Davies; Jacobus J. M. Zuiderwijk; Adrianus M. P. M. Hagelaars, all of Rijswijk, Netherlands

[73] Assignee: Shell Oil Company, Houston, Tex.

[21] Appl. No.: 155,825

[22] Filed: Jun. 2, 1980

Related U.S. Application Data

[63] Continuation-in-part of Ser. No. 79,140, Sep. 26, 1979, abandoned.

[30] Foreign Application Priority Data

Apr. 9, 1979 [GB] United Kingdom .............. 12475/79
Mar. 21, 1980 [CA] Canada .................................. 348115

[51] Int. Cl.$^3$ ...................... E21B 33/138; E21B 43/04
[52] U.S. Cl. .................................. 166/276; 166/280; 166/295
[58] Field of Search .............. 166/276, 295, 278, 280, 166/300

[56] References Cited

U.S. PATENT DOCUMENTS

| | | | |
|---|---|---|---|
| 3,291,213 | 12/1966 | Bezemer et al. | 166/295 |
| 3,294,166 | 12/1966 | Havenaar et al. | 166/295 X |
| 3,294,168 | 12/1966 | Bezemer et al. | 166/295 |
| 3,339,633 | 9/1967 | Richardson | 166/295 |
| 3,815,680 | 6/1974 | McGuire et al. | 166/295 X |
| 3,933,204 | 1/1976 | Knapp | 166/295 |
| 4,000,781 | 1/1977 | Knapp | 166/295 X |
| 4,042,031 | 8/1977 | Knapp | 166/276 |
| 4,042,032 | 8/1977 | Anderson et al. | 166/295 X |
| 4,113,015 | 9/1978 | Meijs | 166/295 |

*Primary Examiner*—Stephen J. Novosad

[57] ABSTRACT

In a well treating process for consolidating a mass of particles with an epoxy resin precipitated from a resin-forming solution, a significant improvement is provided by using: a polyamino curing agent, a particular ratio of curing agent to epoxide, and a pretreatment which wets the particles with an aqueous liquid that contains an effective proportion of a dimethylaminomethyl-substituted phenol.

11 Claims, 8 Drawing Figures

PROCESS FOR CONSOLIDATING WATER-WET SANDS WITH AN EPOXY RESIN-FORMING SOLUTION

This application is a continuation-in-part of application Ser. No. 79,140 filed Sept. 26, 1979, now abandoned.

BACKGROUND OF THE INVENTION

The invention relates to consolidating or strengthening unconsolidated or poorly consolidated subterranean reservoir formations, and/or sand or gravel packs within the borehole of a well, and/or masses of propping particles within hydraulically induced fractures, or the like, within subterranean earth formations.

In various aspects the present invention involves an improvement of a process of the type described in the I. H. Havenaar and F. H. Meijs U.S. Pat. No. 3,294,166 or the F. H. Meijs U.S. Pat. No. 4,113,015. Said 166 patent describes sand consolidations using an epoxy resin-forming solution which contains polyepoxides and polyamino curing agents. That solution contains a ratio of aromatic and aliphatic hydrocarbons which causes it to dissolve those reactants and, without gelation, to precipitate a partially cured epoxy resin which subsequently becomes completely cured. The 015 patent describes a similar process in which the viscosity of such a resin-forming solution is increased by the presence of an otherwise substantially inert oil-soluble polymer. The disclosures of the U.S. Pat. Nos. 3,294,166 and 4,113,015 are incorporated herein by cross reference.

In other aspects, the present invention involves an improvement of a process of the type described in the E. A. Richardson U.S. Pat. No. 3,339,633. The 633 patent describes sand consolidations using an epoxy resin forming solution which contains a polyepoxides and polyamino curing agents and partially cured epoxy resins dissolved in a polar organic group-containing solvent in which they remain dissolved until the polar solvent is contacted by an overflushing portion of predominantly aliphatic hydrocarbon oil solvent that induces the precipitation of a selected proportion of resin on the particles of the sand being consolidated. The disclosures U.S. of Pat. No. 3,339,633 are incorporated herein by cross-reference.

Dimethylaminomethyl-substituted phenols have previously been used in epoxy resin-forming solutions. They are useful as phenolic-type curing rate accelerators, for example, as described in the 166 and 015 patents or the U.S. Pat. No. 3,933,204 by R. H. Knapp and S. G. Almquist. In the latter patent, the resin curing reaction which is accelerated is that between an epoxy-resin-forming epoxide and an acrylic-resin-forming polycarboxide within resin-forming solutions which are adapted for plugging relatively permeable subterranean earth formations.

A different use for the dimethylaminomethyl-substituted phenols is described in the R. H. Knapp U.S. Pat. No. 4,000,781. It describes well treating processes for consolidated particles with aqueous emulsions of epoxy-resin-forming components. In such emulsions such phenols are used as substantially the only curing agent and are dissolved in an epoxide-containing oil solvent which is emulsified within an aqueous liquid. In the process of the 781 patent, the dimethylaminomethyl-substituted phenol functions as both a curing agent and a wetting agent. The surfaces of the particles to be consolidated are coated with the resin-forming solution by controlling the pH of the emulsion so that it breaks while it is in contact with those surfaces.

SUMMARY OF THE INVENTION

The present invention relates to a process for consolidating a mass of contiguous particles within a subterranean location in or near the borehole of a well. In one embodiment a resin-forming solution is compounded so that (a) it consists essentially of a polymerizable epoxy compound containing an average of at least one epoxy group per molecule and an amino curing agent which contains at least three amino hydrogen atoms per molecule and is capable of curing the epoxy compound to a solid resin, (b) the volume ratio between said curing agent and epoxide is from about 0.2 to 0.6 and (c) said curing agent and epoxide are dissolved in a liquid hydrocarbon-containing oil solvent in which the volume ratio of aromatic to aliphatic hydrocarbons is such that the solution remains ungelled while a partially cured epoxy resin is formed, precipitated from the solution, and subsequently, becomes cured. Pretreatment fluid is injected into the mass of particles to be consolidated to the extent required to wet those particles with an aqueous solution which is no more saline than the water then wetting said mass and contains not more than about 1.5% by weight of dissolved salt. At least one dimethylaminomethyl-substituted phenol is dissolved in said resin-forming solution and/or said pretreatment fluid in a proportion providing from about 0.2 to 10% by volume of the phenol in the fluid in which it is dissolved. The resin-forming solution is then injected into the mass of particles to be consolidated in a rate and volume such that (a) the solution permeates the mass before a significant proportion of partially cured resin has precipitated (b) the solution is kept within the mass while the partially cured resin is precipitated, into contact with the particles and the aqueous solution which wets the surfaces of the particles and (c) the precipitated partially cured resin is contacted by the dimethylaminomethyl-substituted phenol which is already dissolved in or is becoming dissolved in said particle-wetting aqueous solution by being partitioned between the resin-forming solution and said aqueous solution, and (d) the solution remains in contact with those particles until the precipitated resin is at least substantially cured.

In general, such a resin-forming solution is compounded by dissolving the curing agents and epoxides in a liquid oil solvent having a concentration of polar organic components such that the solvent is capable of (1) dissolving the epoxy compound and curing agent, (2) remaining ungelled while a partially cured epoxy resin is formed and precipitated or kept in solution and (3) remaining substantially completely miscible with a predominantly aliphatic hydrocarbon overflushing liquid with which the partially cured epoxy resin is substantially completely immiscible. The concentration of the resin-forming solution is adjusted so that it contains from about 5 to 90% by volume of the epoxy compound and curing agent and is capable of subsequently precipitating a selected amount of partially cured resin while being maintained at the temperature of the subterranean location being treated or being mixed with the predominantly alphatic hydrocarbon overflushing liquid. Fluid inclusive of the resin-forming solution or it and the overflushing liquid is flowed into the mass of particles to be consolidated so that the resin-forming solution contacts those particles before a significant proportion of partically cured resin has precipitated and is kept in contact with those particles throughout the precipitation of a selected amount of the partially cured resin.

DESCRIPTION OF THE INVENTION

The present invention is, at least in part, premised on a discovery that, in an epoxy resin-forming sand consolidation process, unexpectedly beneficial results can be obtained by using a particular combination of the kind and proportion of a polyamino curing agent and wetting the particles to be consolidated with an aqueous liquid containing at least one dimethylaminomethyl-substituted phenol. When used as presently specified, such a phenol does not alter the capability of the resin-containing solution to remain ungelled while precipitating partially cured resin and does not accelerate the rate of polymerization, thus shortening the initial resin precipitation time, beyond an extent which is readily controllable by the addition of polymerization rate retardants such as a ketone or the like. But, the presence of that phenol does significantly reduce the cost of the sand consolidation treatment process by eliminating the need for a water-removing preflush. And, it significantly increases the compressive strength that is exhibited by the consolidated sand after an aqueous liquid has flowed through the sand. In addition, when it is used as presently specified, the dimethylaminomethyl-substituted phenol behaves in a manner which is distinctly different from that described in U.S. Pat. No. 4,000,781. In the present process it has no significant affect on the curing of the resin.

In the previously known resin-precipitating type of epoxy resin-forming said consolidation processes, such as those of the 166 or 015 patents, it is essential that the particles being consolidated be substantially oil wet. In treating a sand or the like containing a significant amount of water, a preflush with a liquid which is substantially miscible with both oil and water is required in order to ensure such an oil-wetting of the sand grains.

In such prior processes, substantially any immobile water adhering to the walls of the pore spaces prevents the resinous material from coalescing on the surface of the sand grains and bonding them efficiently. Such water is present in the majority of the subterranean earth formations or masses of contiguous particles that require consolidation treatments and should therefore be removed prior to carrying out the treatments. It was previously believed that such water should be removed when the solvent of the solution containing the resin-forming agents is a nonaqueous liquid, as is the case when using an epoxy resin. The removal of the adherent water prior to injecting the solution containing the resin-forming agents consisting of epoxy compound and curing agent into the pore spaces of the mass of particles to be consolidated allowed the resinous material after being separated from the solution to form a resin layer, on the particles or grains, which layer after hardening thereof shows a sufficient strength. If required, the strength thereof can further be increased by adding a bonding agent (such as a silane) to the resin-forming solution.

It has now been found that where fluids containing aqueous liquids are to be produced through the consolidated particles improved results as to the compressive strength of the consolidated particles can be obtained by allowing the immobile water adhering to the walls of the pore spaces to stay in the parts to be treated when the solution containing the resin-forming agents flows into these parts. It has also been further discovered that a similar type of improvement in the strength of the consolidation can also be obtained by an overflushing procedure of the type described in the 633 patent when the resin-forming solution is compounded so that a precipitation of partially cured resin is induced by a contact with a predominantly aliphatic hydrocarbon overflushing liquid.

Object of the present invention is a method of treating for consolidating purposes parts of a permeable formation or mass of particles surrounding a borehole of a well in a manner that is simple and cheap and results in a high compressive strength at a minimum reduction of permeability.

In the method according to the invention of treating for consolidating purposes parts of a permeable formation surrounding a borehole or well, a predetermined volume of a solution is injected into the pore spaces of the formation parts to be treated, the solution consisting of a solvent having resin-forming agents dissolved therein, which agents consist of at least one epoxy compound and at least one polyamino hardening agent or curing agent for said epoxy compound. The solution is optionally preceded in the formation to be treated by a predetermined volume of a preflush liquid, the solution and the preflush liquid on being injected into the said pore spaced being capable of displacing the mobile fluids present in the pore space but leaving water adhering to the wall of the said pore space. A predetermined amount of at least one dimethylaminomethyl-substituted phenol is dissolved in at least one of the predetermined volumes of solvent and preflush liquid.

In general, between 5 and 90% volume of resin-forming agents may be dissolved in the resin-forming solution. A concentration of from about 5 to 30% volume is preferred for the non-overflushed procedure, while from about 40 to 90% is preferred for the overflushed procedure.

The preflush liquid may be a brine or a hydrocarbon liquid. Also, a brine may be injected, followed by a hydrocarbon liquid. However, when the formation parts to be treated contain water of high salinity, i.e., containing more than about 1.5% by weight of dissolved salt, a brine having a salinity lower than the salinity of this water should be used as a preflush.

The amount of dimethylaminomethyl-substituted phenol should be between 0.2 and 10% by volume of the liquid in which it is dissolved. The dimethylaminomethyl-substituted phenol improves the wetting of the grains or particles by the resinous material that separates from the solution during the hardening of the epoxy compound. As a result thereof, the compressive strength of the formation parts treated by the method of the present invention will be found to be sufficient for the purpose, notwithstanding the fact that immobile water is present on the walls of the pore space. The presence of this water has even been found to be beneficial to the final compressive strength of the treated parts after these have been in contact with oil and water during a considerable producing period. A further advantage of the use of such a dimethylaminomethyl-substituted phenol is that no separate injection of a water-and-oil miscible preflush liquid is required to remove immobile water adhering to the walls of the pore spaces to be treated.

Particular good results will be obtained by using an amount of dimethylaminomethyl-substituted phenol that is between 0.2 and 5% of the volume of liquid in which it is dissolved.

It will be appreciated that where reference is made in the present specification and claims to "% volume" there is meant volume per volume.

The "mobile fluids" referred to herein are fluids that can be displaced through the pore spaces of a formation by fluids of a phase differing from and immiscible with the phase of the said mobile fluids.

"Immobile water" as referred to herein is water adhering to the walls of the pore spaces, which water cannot be displaced from the original position thereof by non-water miscible fluids passing through the said pore space. Water adhering to the walls of the pore spaces includes the water caught by capillary forces in capillary recesses of the pore spaces.

It will be appreciated that the predetermined volume of liquid hydrocarbon that optionally precedes the injection of the resin-containing solution into the formation, will not displace the immobile water adhering to the walls of the formation space. The liquid hydrocarbon does remove mobile fluids present in the pore spaces of the formation part to be treated, these mobile fluids being gas and/or free-draining liquid such as crude oil and/or brine not adhering to the walls of the pore space.

The water in an underground formation is usually a brine. High salt concentrations may lower the compressive strength of the consolidated formation part to an undesirable extent. When it is desirable to replace the adherent water by water of lower salinity and/or containing salts other than the salts present in the connate water, a predetermined volume of a brine containing less than about 1.5% dissolved salt may be injected as a preflush, either directly preceding the injection of the predetermined volume of the solution containing the resin-forming agents, or preceding an injection of a predetermined volume of liquid hydrocarbons. This brine may remove little or no crude oil from the pore spaces of the formation part to be treated. But, the injected brine may displace or dilute the connate water, that is the volume of immobile water adhering to the walls of the pore spaces, as well as the free-draining portion of the connate water. Subsequently, the mobile portion of the brine is replaced by the solution of resin-forming agents (or by a liquid hydrocarbon injected as a preflush), which leaves only the immobile portion of a relatively dilute brine in the formation parts to be treated, in the form of a layer that adheres to the walls of the pore spaces.

The water or brine adhering to the walls of the pore spaces of the formation part to be treated has now been found to play an important role in the consolidated process. As will be shown hereinafter, the compressive strength of a formation wherein the resin-containing solution is brought into contact with water-wetted walls is considerably improved as compared to a treatment of "dry" or oil-wet walls, that are walls from which the immobile water adhering to the walls of the pore spaces has been removed by a treatment of an oil-miscible liquid, such as isopropyl alcohol (IPA) that is capable of displacing such immobile water. However, to reach such favorable results, it is a prerequisite that the immobile water should contain a relatively specific proportion of dimethylaminomethyl-substituted phenol. Either the original water or brine present in the formation is replaced by water (or brine) containing such a phenol, or the original water (or brine) present in the formation is brought into contact with a solution of such a phenol. In the latter case, the original brine if being a highly saline brine, may be replaced by a brine of lower salinity before injecting the solution of the phenol.

The expression "epoxy compound" used in the present specification and claims means a monomeric and/or polymeric organic polyepoxide having on average more than one epoxy group per molecule. Preferred polyepoxides are polyglycidyl ethers of polyhydric phenols; an example thereof is the liquid epoxy resin "EPIKOTE" 828 ("EPIKOTE" is a registered trademark). Such epoxy compounds can be cured or hardened by reaction with suitable curing or hardening agents to form hard resinous materials that are insoluble and infusible under formation conditions. The rate of the curing or hardening can often be accelerated by the presence of accelerators such as phenols (or tertiary amines).

As indicated in the 166 and 15 patents, suitable hardening agents for use in the present invention are polyamines, having at least three amino hydrogen atoms per molecule, and in particular aromatic polyamines of this type are preferred. Examples of such aromatic polyamines are diaminodiphenylmethane, diaminodiphenylsulphone, m-phenylenediamine, with the first one being preferred. Aliphatic polyamines such as diethylenetriamine can be used as hardening agents when the temperature in the formation is rather low, for example not above room temperature. Usually, however, the temperature is higher, in the range from 50° to 100° C. and then the aromatic polyamines provide a better balance between the time interval after which the resinous material starts to separate from the solution (the so-called IRS-time or Initial Resin Separation-time) and the time period after which final hardening has taken place.

Although, as described in the 166 patent, the choice of the hardening agent may depend on the temperature of the underground formation and the residence time before initial cure and precipitation of resinous material sets in, in the present process it is important that the volume ratio of hardening agent to epoxy compound be from about 0.2 to 0.6.

Phenols can be used to accelerate the hardening reactions, and so assist in regulating the IRS-time and final hardening. Suitable phenols to be used as accelerator are phenol and alkylated phenols, such as cresols and xylenols.

It should be kept in mind that the dimethylaminomethyl-substituted phenols used in the method of the present invention, for controlling the wetting properties of the resin-containing solution and/or preflush, are also accelerators. Therefore, the right balance for the rate of hardening should be found by a proper choice of type and amount of other phenols, and/or curing rate retarders, such as ketones. Ketones as a solute of the resin-forming solution will slightly retard the hardening reaction, and so permit an even more accurate regulation. Suitable ketones are acetone, methylethylketone, methylisobutylketone, and cyclohexanone.

It will be appreciated that the amount of the resin-forming agents consisting of epoxy compound and hardening agent should be chosen such in relation to the natural compressive strength of the formation to be treated and the size of the solid particles or grains of said formation. The proportion of resin-forming components should be low enough so that the permeability of the pore spaces of the mass of particles and/or reservoir formation is not decreased to an undesirable extent, while being high enough so that the compressive strength after treatment is at a value sufficiently high to withstand formation pressures occurring after the well has been re-opened for production therethrough. For the majority of consolidating treatments, the amount of resin-forming agents is in the range between 5 and 30% volume of the solution.

The dimethylaminomethyl-substituted phenol used in the method of the present invention for improving the wetting properties of the resin-containing solution comprises at least one substituted phenol in which the substituent is a dimethylaminomethyl group, i.e., (—CH$_2$N(CH$_2$)$_2$) group, in the ortho, meta or para position. It has —as will be shown hereinafter—only a negligible activity as hardening agent for the epoxy compound in the specific composition used in the present treating method. In that composition, it acts primarily as a wetting agent for the resinous material, and also as a reaction rate accelerator. Attractive results are obtained by application of the method of the present invention, wherein dimethylaminomethylphenol is present in the resin-containing solution and/or the preflush in amounts between 0.2 and 10.0% volume of the volume of liquid wherein it is dissolved. Optimum results will be obtained in the range between 0.5–1.5% volume.

If desired, a bonding agent may be added to the resin-containing solution for improving the compressive strength of the consolidated mass of formation particles. Bonding agents, such as organo-functional silanes are known components of epoxy compound containing consolidation compositions. The organo-functional silane contains at least one silicon atom, at least one functional group suitable for reacting with the material of the particles of the mass to be treated, and at least one other functional group (such as an amino group, a methoxy group, an ethoxy group, or an epoxy group) suitable for reaction with the epoxy compound, the hardening agent, or other reactive material, such as precondensates formed by the reaction of the latter components.

As indicated in the 166 patent, a suitable solvent for the non-overflushed procedure is a liquid mixture of aromatic and non-aromatic hydrocarbons containing sufficient aromatics to maintain the gelled intermediate resin product in solution while the solution is being flowed into the mass of particles to be consolidated. The epoxy resin and curing agent start to react within the resin-formin solution at the temperature and conditions encountered at the time they are mixed. Their reaction forms a partially cured or intermediate resinous reaction product which must have both an initial solubility in the solution and the capability of being precipitated from the solution after it has flowed into the formation to be consolidated. The separated, partially cured ungelled resin accumulates on the particles to be consolidated. When those particles are wetted with a layer of relatively nonsaline aqueous liquid which then contains an effective amount of at least one dimethylaminomethyl-substituted phenol, or is then acquiring such a phenol, by a partitioning effect from the resin-forming solution, partially cured resin forms a strong intergranular cementing material bonded to the surfaces.

Liquid aromatic hydrocarbons that are suitable for use in the present method, are benzene and alkyl derivatives thereof such as toluene, xylenes, or liquid aromatic extracts of crude oil distillates, such as kerosine, gasoil, spindle oil, lubricating oil fractions, or liquid aromatic extracts of heavy cat-cracked cycle oil. The solvent may contain a liquid hydrocarbon mixture known under the registered trademark "SHELLSOL" N which has an aromatic content over 80% volume.

Alchols (such as methanol, ethanol, a propylalcohol or a mixture of at least two of these liquids) are also suitable components for the solution containing the resin-forming agents, but should, however, be used in minor amounts only (say not more than 20% volume). Since the relatively polar alcohols tend to displace immobile water when being injected into the formation. As indicated above, the presence of water containing an effective amount of dimethylaminomethylphenol on the walls of the pore space is a prerequisite for carrying out the method of the present invention. Therefore, care should be taken that the total amount of the immobile water is not removed from the formation pore space to be treated prior to the period that the resinous material starts to separate from the solution. And, relatively minor amounts of alcohols should be present in the resin-forming solution.

As indicated in the 633 patent, in the overflushed particle consolidating process the epoxy compound, curing agent and partially cured resin must be insoluble in the overflushed liquid but soluble initially in the solvent for the resin-forming solution. Suitable solvents for use in such resin-forming solution are those containing enough polar groups to provide an affinity for polyepoxide and its partial polymers without being so polar as to create an immiscibility with a predominantly aliphatic hydrocarbon solvent. Suitable solvents include methyl acetate, amyl acetate, acetone, methyl ethyl ketone, epichlorohydrin, styrene oxide, phenyl glycidyl ether, aliphatic glycydyl ethers, benzene, toluene, and the like. The overflushing liquid should be one in which the polyepoxides, polyamines and the reaction products are virtually insoluble but one with which the solvent for the resin forming solution is substantially completely miscible. Suitable overflushing liquids comprise predominantly aliphatic hydrocarbon fractions of crude oil, distillates such as bright stock oil or diesel oil, and the like.

Accelerators and retarders, commonly named hardening rate controllers, when present, should not displace the majority of the immobile water adhering to the wall of the pore spaces, or otherwise influence the treating process to an undesirable extent. The hardening rate controllers are chosen to control the rate of hardening in such a manner that the resinous material does not start to be separated from the solution under the prevailing temperature conditions in the well, prior to the moment that the solution has permeated the pore space of the formation part to be treated.

often it will be found desirable to increase the viscosity of the resin-containing solution to prevent fingering of the solution through the formation pore space. The viscosity of the solution should therefore be made higher tha the viscosity of the liquid contents of the pore space. Although substantially any viscosifying agent that is compatible with the components of the resin-containing solution and the required reaction between the resin compound and the hardening agent can be used, for increasing the viscosity of the resin-containing solution to the desired value, the oil soluble-polymers of the type described in the 15 patent are particularly suitable. Polymers and copolymers (such as isoprene-styrene copolymers, polyisobutene polymers, polymethacrylate polymers, olefinic polymers, and the synthetic rubbers such as butadiene-styrene copolymers) have been found useful in this respect, as described in the 15 patent, provided that concentrations are used at which gelling of the solution does not occur.

The predetermined volume of liquid hydrocarbons that may optionally be injected prior to the injection of the resin-containing solution to remove the mobile fluid contents from the pore space of the parts to be treated, may comprise at least 50% by volume aromatic liquid hydrocarbons, such as toluene, xylenes or liquid aromatic extracts of crude oil distillates, such as kerosene, gasoil, spindle oil, lubricating oil fractions, or liquid aromatic extracts of heavy cat-cracked cycle oil, and may be supplemented with other hydrocarbon liquids such as kerosene or diesel oil.

All these hydrocarbons are suitable for displacing the mobile fluid contents present in the pore space of the formation, and are further compatible with the resin-containing solution. There is no objection, however, to place a spacer liquid between the volume of liquid hydrocarbons and the resin-containing solution. Use of a spacer liquid may be desirable when considerable mixing is expected between the resin-containing solution and the preflush during the flow thereof through the well.

Suitable spacer liquids are aromatic hydrocarbon liquids, kerosene or suitable derivatives thereof, or aromatic hydrocarbons obtained by extraction of kerosene, gasoil, etc.

If desired, the dimethylaminomethyl phenol that is required for improving the wetability of the surfaces of the grains of the formation may be added to the volume of the liquid hydrocarbon preflush instead of to the resin-containing solution. Also, the dimethylaminomethyl phenol may be added to the preflush liquid as well as to the resin-containing solution.

The brine that may optionally be injected as a preflush either prior to the volume of liquid hydrocarbons or prior to the solution of resin-forming agents will be most effective if having a salinity lower then the salinity of the water present in the formation. Thus, if the formation water comprises 10% by weight NaCl, a brine comprising 1.0% by weight KCl or 1.0% by weight $CaCl_2$ may be injected to displace this formation water and other fluid contents present in the pore space. Thereafter, this low-saline brine is partly displaced by the volume of liquid hydrocarbons (or the solution of resin-forming agents), which leaves, however, immobile low-saline brine adhering to the walls of the pore space. The relatively low salinity of the adhering brine will be compatible with the components of the resin-forming solution, and the strength of the bond thus obtained will be considerably greater than the strength of the bond obtained without applying the brine preflush.

The predetermined volumes of the various liquids and solutions used in the present invention are chosen in relation to the formation to be treated. Generally good results will be obtained by using the following volumes:
solution of resin-forming agents: 1 pore volume
preflush of hydrocarbon liquids: 1 pore volume
preflush of brine: 2 pore volumes
preflush of brine followed by liquid hydrocarbon: 1 pore volume each
spacer liquid: 1 pore volume It will be appreciated that the present treating method will be considerably simpler and cheaper than the methods requiring preflushing of the pore space by liquids for displacing the adherent water from the formation parts to be treated. The use of these liquids, such as alcohols (e.g., isopropyl alcohol) adds considerably to the cost of the treatment. Moreover, when preflushing by means of alcohols (as are often chosen for their excellent displacement efficiency) plugging of the pore space may occur since the alcohols when passing through the well tubing will remove dirt and rust from the inner wall of the tubing, which dirt and rust will be deposited in the pore space and in the entrance openings to the formation pore space, and may thereby seriously decrease the permeability thereof. Further, when in contact with saline water in the pore space, the alcohols may precipitate salts that cause then further plugging of the formation pore space. In contact with waxy crudes, the alcohols will further cause precipitation of wax, and when in contact with clays (as are often present in hydrocarbon-containing formations) swelling and flocculation will occur. It will be appreciated that although alcohols have excellent water-displacing properties, the actual application thereof will be accompanied by undesirable permeability reduction of the formation being treated. The present method which does not require the use of a water-displacing liquid is therefore applicable in various types of formations, and has the advantages of simplification and consequently better chances on a successful job (since a limited number of liquid slugs are to be injected), low cost (since no expensive alcohol preflushes are required), low permeability reductions (since injected fluids are compatible with the conditions prevailing in the well and the formation), and high compressive strength (since the presence of adhering water has been found to favorably influence the compressive strength after a prolonged contact with water during the subsequent recovery period).

Figure 1:
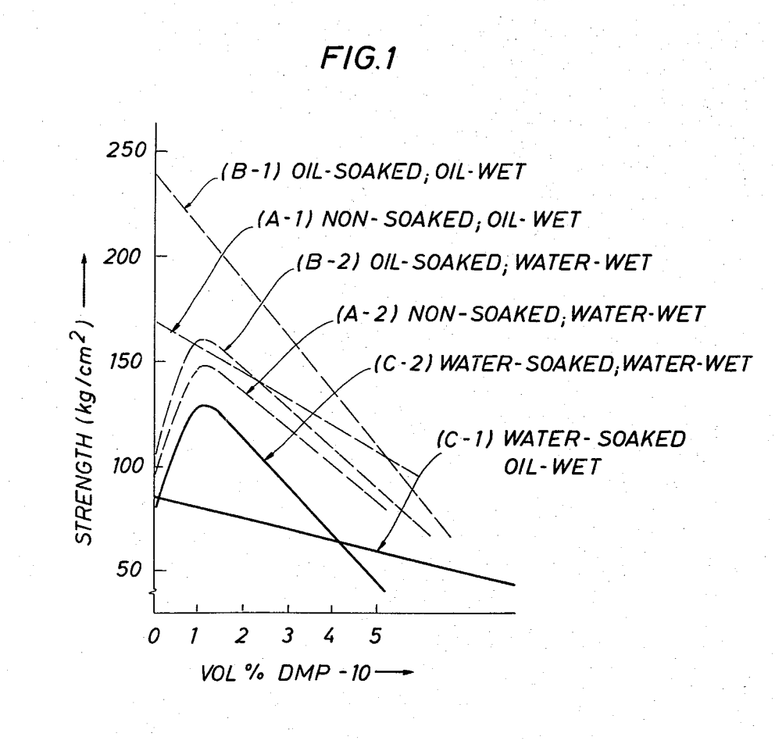
FIG. 1 shows the effect of a dimethylaminomethyl-substituted phenol on the compressive strength of masses of particles consolidated with and without a previous removal of adherent water.

FIG. 1 shows test data relating to the influence of the addition of various amounts of DMP-10 (a dimethylaminomethyl-substituted phenol that predominates in ortho and para substituents and is commercially available from Rohm and Haas) to a self-precipitating resin-forming solution for consolidating sandpacks that were (1) preflushed to remove water and leave an oil-wet sand and (2) preflushed to leave a water-wet sand.

In each case, after consolidation, the sandpacks were subjected to load tests at a temperature of 60° C. to determine the unconfined compressive strength thereof, that is the compressive strength of a cylinder of 3.7 cm diameter and 3.7 cm height, loaded in its axial direction, and not supported at the side walls thereof. The unconfined compressive strength after 24 hours hardening at 60° C. was measured at this hardening temperature:
  directly after hardening, i.e., "non-soaked", (see curves A-1 and A-2 in FIG. 1;
  after being "oil-soaked", i.e, contacted with gasoil for a period of a week at 60° C. (see curves B-1 and B-2 in FIG. 1); and
  after being "water-soaked", i.e, contacted with fresh water for a period of a week at 60° C. (see curves C-1 and C-2 in FIG. 1).

The sandpacks were formed by filling glass cylinders with Oude Pekela sand, and subsequently flushing the sandpack with gasoil followed by brine (containing 1% weight NaCl). In the "oil-wet" sands, the total liquid content of the pore space, including the adhering water, was removed from each sandpack by flushing the sandpack with three pore volumes of isopropylalcohol. Then two pore volumes of a solution containing resin-forming agents were injected into the sandpack and kept in place in the pore space until hardening of the resin had taken place.

The resin-forming agents dissolved in this solution were:
  11.2% volume epoxy compound;
  3.7% volume hardening agent, being diaminodiphenylmethane (DDM).

The solution used was a liquid composition consisting of:
  2.4% volume isopropylalcohol (IPA);
  7.8% volume acetone;
  27.0% volume kerosene, and
  62.8% volume xylene.

Further, DMP-10 was added to the various solutions in amounts equal of 0; 0.5; 1; 2; 3 and 5% volume. This range of 0-5% volume DMP-10 is being indicated on the X-axis of the diagram of FIG. 1. Curves A-1, B-1 and C-1 relate to this first series of tests.

In the second series of tests, each sand pack was flushed by means of two pore volumes of gasoil, as a result whereof the mobile liquid, but not the adherent water, was displaced from the pore space of the sandpack. Subsequently, two pore volumes of the resin-containing solution of the same composition as used in the first series of tests were injected and kept in place in the pore space of the sandpack until the resin had hardened. The amounts of DMP-10 added to the various solutions in the second series of tests were equal to the amounts of 0; 0.5; 0.75; 1; 1.5; 2; 3 and 5% volume as in the first series of tests. Curves A-2, B-2 and C-2 relate to this second series of tests.

After the curing, the consolidated sandpack of each test was detached from the glass cylinder and three samples of 3.7 centimeters' length were cut therefrom. One sample of each test was subjected to a load test to determine the unconfined compressive strength thereof. The compressive strength (in kg/cm$^2$) was indicated along the Y-axis of FIG. 1 in relation to the amount of DMP-10 added to the solution, and curves A-1 and A-2 in FIG. 1 indicate this relationship for the first and second series of tests, respectively. As can be seen, the compressive strength of the "oil-wet" samples wherein the adherent water has been removed prior to injection of the resin-containing mixture (see curve A-1) is—for all amounts of DMP-10 added—greater than the compressive strength of the "water-wet" samples wherein the water has not been removed (see curve A-2).

During oil production periods, however, the consolidated formation part will be contacted with large amounts of crude oil flowing through the pore space. This contact will increase the unconfined compressive strength of the consolidated mass, and to determine the influence of the crude oil on the compressive strength with respect to various amounts of DMP-10 in the above referred two series of tests, a sample of each test was subjected to a gasoil flush at 60° C. over a period of a week. The "oil-soaked" curves B-1 and B-2 show the results and as can be seen from the diagram the compressive strength of the "water-wet" sample wherein the adherent water has not been removed (curve B-2) is, over the whole range, lower than the compressive strength of the "oil-wet" sample wherein the adherent water has been removed prior to the treatment by the resin-containing solution (curve B-1).

Apart from being contacted by crude oil, the walls of the formation pore space will, however, also be contacted by water during the productive period of the well around which a consolidation treatment has been carried out. The compressive strength is negatively influenced by such water contact as can be seen by comparing curves A-1 and C-1 in the diagram of FIG. 1, wherein curve C-1 shows the relationship between the unconfined compressive strength and the amount of DMP-10 after one week flushing at 60° C. by water in "oil-wet" samples wherein the adherent water has been removed prior to the treatment by the resin-containing solution. Curve C-2 shows the sample relationship in "water-wet" samples wherein the adherent water has not been removed.

Comparing the final unconfined compressive strengths that are being measured in the test samples that are being subjected to water flooding, it will be obvious that the best results are being obtained by the use of DMP-10 in consolidating treatments that are carried out in water-wet sandpacks that have water adhering to the wallof the pore space. By dissolving DMP-10 in the above-referred resin-containing solution in amounts in the range of 0.25-4.3% volume, the final unconfined compressive strengths of the water-flooded samples that did not have the immobile water removed from the pore space thereof prior to the consolidating treatment (see curve C-2), will be higher than the corresponding compressive strengths of water-flooded samples that had the immobile water removed from the walls of the pore space prior to consolidating (see curve C-1).

Thus, in actual field operations where water will be produced together with oil via the consolidated areas around a producing well, the use of dimethylaminomethylphenol in consolidating treatments without prior water removal from the treated areas will yield the highest compressive strength during the operational life of the well.

The above-described tests resulted in an accpetable decrease in permeability of the sandpack. The original single-phase permeability of the sandpack was about 8.5 Darcy, at a porosity of about 37%. The permeability after treatment ranged between 5 and 7 Darcy, which was considered quite acceptable for production purposes.

Figure 2:
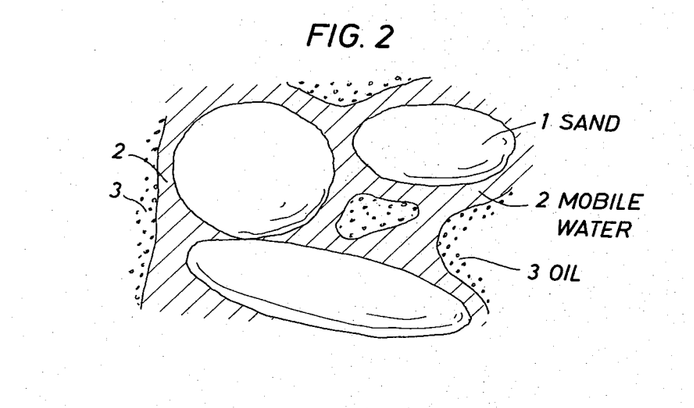
FIGS. 2 and 5 show various stages of liquid displacements and resin separations in the pore spaces of an earth formation being treated by the present process.

FIG. 2 of the drawings shows (on an enlarged scale) an assembly of sand-grains 1, containing connate water and oil in the pore space between the grains. The surface of the grains is water-wet, as a result whereof the grains are covered by water layers 2 between which oil 3 is present.

Figure 4:
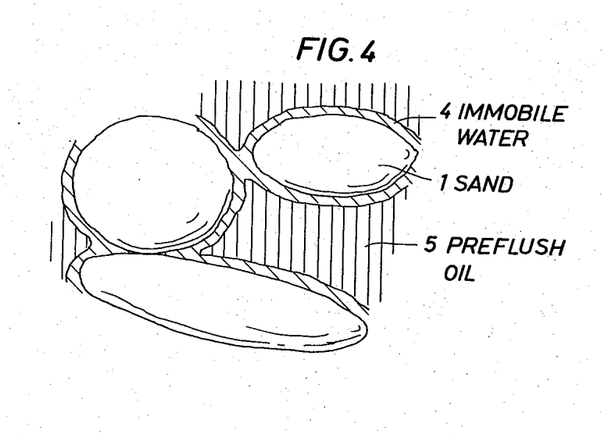

In one of the modes of treating the sand-grains by the method according to the present invention, a hydrocarbon preflush 5 (see FIG. 4) is injected into the pore space of the formation parts to be consolidated, whereby the mobile liquid contents of this pore space are removed therefrom, but an immobile thin layer of adherent water 4 remains on the surface of the grains 1 (compare FIGS. 2 and 4). The hydrocarbon preflush 5 is subsequently displaced by a resin-containing solution 6 (see FIG. 5), which solution leaves the adherent water in place. DMP-10 is dissolved in this soluion which DMP-10 will upon contact of the resin-containing solution with the water layer 4, partially enter this layer, thereby rendering the surface of the grains 1 wettable by the resin that starts separating from the solution by the reaction between the resin and the curing agent present in the solution 6 containing the resin-forming agents.

Figure 5:
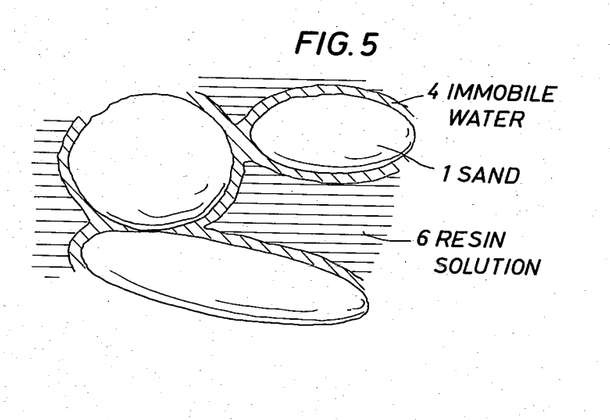

The separated resin is deposited in the form of droplets on the surface of the grains, which droplets coalesce by the presence of DMP-10 on the surface, thereby forming resin layers that are partly sucked by capillary action into the spaces of minute dimensions around the contact points of the grains. After hardening of the resin, the grains will be bonded by the resin present around these contact points, whereby the passageways through the pore space are left substantially unobstructed to allow flow of formation fluids to the production well.

Figure 3:
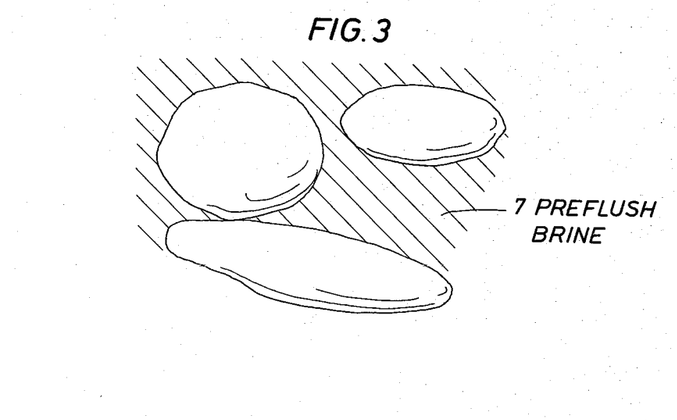

If the connate water 2 (see FIG. 2) has a salt content that would undesirably reduce the compressive strength, the pore space between the grains 1 should first be treated by passing a predetermined volume of brine 7 therethrough, which brine has a considerably lower salt content. FIG. 3 shows the pore space after such flushing treatment with brine. The total volume of the pore space now contains brine 7. This brine is subsequently displaced by injecting a predetermined volume of hydrocarbon liquid through the pore space whereby only adherent water 4 of the brine composition is left on the surface of the grains (see FIG. 4). Thereafter, the resin-containing solution 6 is injected in the pore space, which solution displaces the hydrocarbon 5, but leaves the adherent water 4 (of brine composition) on the surface of the grains (see FIG. 5). DMP-10 from this solution then enters the adherent water 4, and the resin on being separated from the solution 6 is deposited on the surface of the grains in the form of droplets that coalesce under influence of the DMP-10 and are collected in the locations around the contact points of the grains.

If desired, a suitable spacer liquid (not shown) may be injected after the hydrocarbon liquid 5 (see FIG. 4) and prior to the injection of the resin-containing solution 6 (see FIG. 5) to separate the liquid 5 from the solution 6. The spacer liquid should be compatible with the liquid 5 as well as with the solution 6, and should not displace the water layer 4.

The application of dimethylaminomethylphenol in the consolidating treatment according to the present invention is not restricted to the addition of dimethylaminomethylphenol to the solution containing the resin-forming agents. Good results will also be obtained by adding the dimethylaminomethylphenol either only to the preflush liquid (that is the brine and/or the hydrocarbon liquid) or to the preflush liquid and the solution containing the resin-forming agents and/or to a spacer liquid.

As has been observed already above, the compressive strength of the formation parts treated by the method of the present invention may further be improved by adding a bonding agent to the solution containing the resin-forming agents.

Suitable bonding agents are organo-functional silanes which silanes are organic substances containing at least one silicon atom, at least one functional group suitable for reacting with the particles to be treated, and at least one other functional group suitable for reacting with one of the resin-forming agents or with the product formed thereby.

An example of an organo-functional silane is an "amino-functional silane", which is an organic substance containing at least one silicon atom, at least one functional group suitable for reacting with the particles to be treated, and at least one amino group suitable for reacting with one of the resin-forming agents or with the product formed thereby. A further example of organo-functional silane is an "epoxy-functional silane", which is an organic substance containing at least one silicon atom, at least one functional group suitable for reacting with the particles to be treated, and at least one epoxy group suitable for reacting with one of the resin-forming agents, or with the product formed thereby.

If the particles to be treated substantially consist of siliceous material, the functional group suitable for reacting with the particles is preferably formed by a methoxy group or an ethoxy group.

Examples of amino-functional silanes are N-aminoethylaminopropyltriethoxy-silane and aminopropyltriethoxy-silane.

Examples of epoxy-functional silanes are glycidoxypropyltrimethoxy-silane and 3,4-epoxycyclohexylethyl-trimethoxy-silane.

The bonding agents may be added in amounts between 0.1 and 1% volume of the solution containing the resin-forming agents. Optimum results will be obtained by using amounts between 0.2 and 0.3% volume.

The addition of dimethylaminomethylphenol increases the reaction rate between the epoxy compound and the curing agent. At relatively high temperatures of the formation to be treated, it may therefore be required to add reaction rate retarding agents, such as ketones (e.g. acetone, methylethylketone, methylisobutylketone and cyclohexanone).

Figure 6:
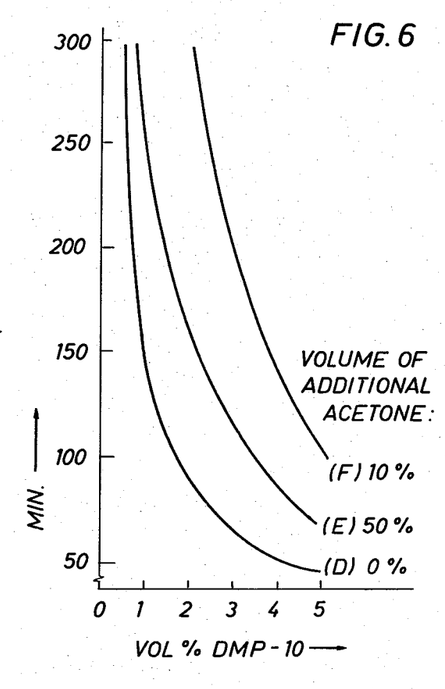
FIG. 6 shows the influence of acetone on the initial resin separation time in resin solutions containing various amounts of dimethylaminomethyl-substituted phenol.

FIG. 6 shows the influence of acetone on the so-called IRS-time of the reaction between the epoxy compound and the hardening agent. By the expression IRS-time is meant the Initial Resin Separation-time that is the time interval between the moment of preparation of the solution and the moment at which the first droplets of the intermediate resinous product start to separate from the solution.

The solution containing resin-forming agents applied in the tests having the results thereof shown in FIG. 6, consits of:
11.2% volume epoxy compound, and
3.7% volume diaminodiphenylmethane (hardening agent) dissolved in a solvent, consisting of:
2.4% volume IPA;

7.8% volume acetone;
27.0% volume kerosene, and
62.8% volume xylene.

The graph in FIG. 6 shows the IRS-time (in minutes) along the Y-axis and the volume percent of DMP-10 in the resin-forming solution along the X-axis. Curves D, E and F indicate the relationship between the IRS-time and the volume percent of DMP-10 at extra acetone amounts in the solution of 0% volume, 5% volume and 10% volume, respectively, at curing temperatures of 60° C.

Figure 7:
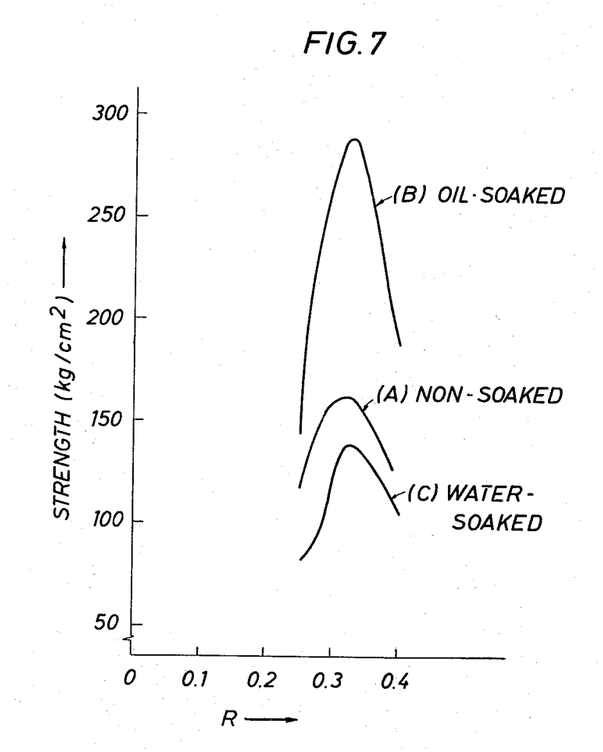
FIGS. 7 and 8 show the relation between compressive strength and the ratio of curing agent to epoxide in the presence of different concentrations of dimethylaminomethyl-substituted phenols with respect to the strength with and without flushing the consolidated masses with an oil or an aqueous liquid.
Figure 8:
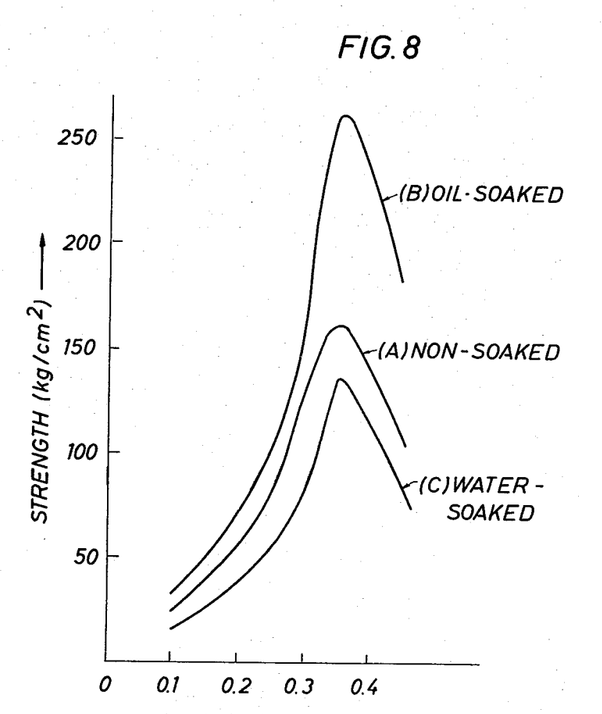

The graphs in FIGS. 7 and 8 show that the unconfined compressive strength of a mass of particles treated by the present method is influenced by the ratio of the hardening agent/epoxy compound in the solution containing the resin-forming agents. In the solution, a constant amount of 11.2% volume epoxy compound "EPIKOTE" 828 was used, and an amount of hardening agent diamino diphenylmethane (DDM) was added to obtain the hardening agent/epoxy compound volume ratio R indicated along the X-axis of the graphs.

The resin-forming components were dissolved in a solvent consisting of:
2.4% volume isopropylalcohol (IPA);
7.8% volume acetone;
27.0% volume kerosene, and
62.8% volume xylene The mass of particles was equivalent to the sandpack as described with reference to FIG. 1. The mass was preflushed by two pore volumes of "SHELLSOL" N. No spacer liquid was used.

In each of the FIGS. 7 and 8, the Y-axis indicates the unconfined compressive strengths of the samples in kg/cm$^2$, measured at a hardening temperature of 60° C. Curves A, B and C indicate the relationships between the strength and the hardening agent/epoxy compound ratio R after 24 hours after hardening, after seven days gasoil flushing and after seven days water flushing, respectively.

The results shown in FIG. 7 are obtained by adding 0.5% volume DMP-10 to the solutions, whereas the results shown in FIG. 8 were reached by adding four times as much DMP-10 (2.0% volume) to the solutions. As can be seen from the graphs in FIGS. 7 and 8, the amount of DMP-10 added to the solution hardly influences the hardening agent/epoxy compound ratio R at which maximum compressive strength of the sandpack is obtained, and therefore it can be concluded that, in such a resin-forming solution, the dimethylaminomethylphenol has only a negligible activity as a hardening agent at formation temperatures.

The following is a postulated well treatment by the non-overflushed method of the present invention. Assume that the formation to be treated contains crude oil, and an aqueous solution containing about 10% by weight NaCl. In view of this high salinity it is desirable to displace the liquid in the pore space of the parts to be treated by a brine of low salinity, i.e., a water solution of potassium chloride in an amount of 1.5% by weight, such as one found in laboratory experiments to reduce the compressive strength only slightly. Assume that the depth and temperature in the formation are about 1965 meters and 61° C. The components of the resin-forming solution are selected such that an IRS-time of 150 minutes will provide sufficient for pumping the solution (after preparation thereof) into that formation, prior to resin droplets being separated from the solution. The amounts of the resin-forming agents are preferably selected so that a minimum of permeability reduction is exhibited in laboratory simulation treatments which provide an adequate compressive strength.

And, also assume that a viscosifying agent is selected to improve the distribution of the solution containing the resin-forming agents over the formation layers of various permeabilities in the interval to be treated.

The treating method to be carried out for consolidating the particular formation consists of the following steps:
1. Clean the production tubing present in the well by pumping a volume of about 1200 liters of 15% HCl down the well to the lower end thereof and subsequently producing it back.
2. Set packers to limit the interval to be treated.
3. Inject 8000 liters of brine containing 1.5% by weight KCl through the tubing and into the interval to be treated.
4. The brine injection is followed by the injection of a volume of 4000 liters hydrocarbon liquids consisting of 50% volume "SHELLSOL"-N;
   50% volume gasoil, to which were added
   35 kg/m$^3$ "SHELLVIS"-50 ("SHELLVIS" is a registered trademark) as a viscosifying agent.
5. Inject 4000 liters of the solution containing resin-forming agents after its preparation down the well to the interval to be treated.
   0.75% volume DMP-10 (dimethylaminomethylphenol): and
   0.25% volume A 1100 ® (bonding agent) dissolved in a solvent consisting of:
   2.4% volume IPA (isopropylalcohol);
   7.8% volume acetone;
   27.0% volume kerosene, and
   62.8% volume xylene
6. To the solution were added 40 kg/m$^3$ "SHELLVIS"-50 as a viscosifier. The solution is pumped down the well and into the interval to be treated by means of a volume of diesel oil, until the solution has fully entered the pore space to be treated. A volume space liquid (4000 liters, consisting of 50% volume "SHELLSOL"-N and 50% volume gasoil) is injected between the diesel oil and the solution.
7. The well is shut in for 16 hours to allow the epoxy compound to harden.
8. Subsequently, the well is opened for production.

It should be noted that the method according to the present invention apart from being used for consolidating particles or grains that originally form part of the underground formation to be treated, may also be used for consolidating particles that have been supplied to the formation during a preceding treatment, or simultaneously with the solution containing the resin-forming agents. Such particles are, e.g., grains that are used for gravel-packing purposes, or propping agents that are applied in fractures to counteract closing of the fracture after its formation. These particles or grains, after being placed down in the well or in a fracture, form part of the formation and should often be consolidated to prevent them from being entrained by the production fluids flowing therealong.

What is claimed is:
1. A well treating process for consolidating a mass of contiguous particles within a subterranean location in or near the borehole of a well comprising:
   compounding a resin-forming solution which consists essentially of (a) at least one polymerizable epoxy compound having an average of at least one epoxy group per molecule and at least one amino curing agent which contains at least three amino hydrogen atoms per molecule and is capable of curing the epxoy compound, (b) a volume ratio between the curing agent and epoxy compound of from about 0.2 to 0.6 and (c) a liquid oil solvent which contains aromatic and nonaromatic hydrocarbons in a volume ratio such that the solution remains ungelled while a partially cured epoxy resin is formed, precipitate from the solution, and substantially completely cured, within said subterranean location;

injecting at least one pretreatment fluid into the mass of particles to be consolidated to the extent required to wet those particles with an aqueous solution which is no more saline than the water then in said mass and contains not more than about 1.5% by weight dissolved salt;

dissolving in said resin-forming solution and/or pretreatment fluid an amount of at least one dimethylaminomethyl-substituted phenol to provide a proportion of about 0.2 to 10% by volume of that phenol within the fluid in which it is dissolved; and, injecting said resin-forming solution into the mass of particles to be consolidated in a rate and volume such that the solution enters the mass before a significant proportion of partially cured resin has precipitated and is kept within said mass at least substantially throughout the precipitating and curing of that resin.

2. The process of claim 1 in which the total volume of the epoxy compound and curing agent amounts to about 5 to 30% of the volume of the resin-forming solution.

3. The process of claim 2 in which a liquid hydrocarbon preflush fluid is injected.

4. The process of claim 3 in which an aqueous liquid preflush fluid which is no more saline than the water then in the mass of particles and contains not more than about 1.5% by weight of dissolved salt, is injected.

5. The process of claim 3 or 4 in which the proportion of dissolved dimethylaminomethyl-substituted phenol provides about 0.5 to 1.5% by volume of the solution in which it is dissolved.

6. The process of claim 3 or 4 in which a viscosity increasing amount of an oil soluble polymer is dissolved in the resin-forming solution.

7. The process of claim 6 in which an amount of sand or gravel which is capable of forming a sand or gravel pack within a wellbore is suspended within at least a portion of the resin-forming solution.

8. The process of claim 6 or 7 in which the dimethylaminomethyl-substituted phenol contains a mixture of ortho and para substituents and its concentration is from about 0.25 to 4.3% by volume of the solution in which it is dissolved.

9. A well treating process for consolidating a mass of contiguous particles within a subterranean location in or near the borehole of a well comprising:

compounding a resin-forming solution which consists essentially of (a) at least one polymerizable epoxy compound having an average of at least one epoxy group per molecule and at least one amino curing agent which contains at least three amino hydrogen atoms per molecule and is capable of curing the epoxy compound, (b) a volume ratio between that curing agent and epoxy compound of from about 0.2 to 0.6 and (c) a liquid oil solvent having a concentration of organic polar groups such that the solvent is capable of (1) dissolving the epoxy compound and curing agent, (2) remaining ungelled while a partially cured epoxy resin is formed and precipitated or kept in solution and (3) remaining substantially completely miscible with a predominantly aliphatic hydrocarbon overflushing liquid with which the partially cured epoxy resin is substantially completely immiscible;

adjusting the concentration of the resin-forming solution so that it contains a proportion of from about 5 to 90% by volume of the dissolved epoxy compound and curing agent and is capable of subsequently precipitating a selected amount of partially cured epoxy resin while being maintained at the temperature within the subterranean location or being mixed with a predominantly aliphatic hydrocarbon overflushing liquid within said location;

flowing at least one pretreatment fluid into contact with the mass of particles to be consolidated to the extent required to wet those particles with an aqueous solution which is no more saline than the water then present in or around the borehole of the well being treated and contains not more than about 1.5% by weight dissolved salt;

dissolving in the resin-forming solution and/or pretreatment fluid an amount of at least dimethylaminomethyl-substituted phenol sufficient to provide a proportion of about from 0.2 to 10% by volume of such phenol within the fluid in which it is dissolved; and flowing fluid inclusive of the resin-forming solution or it and said overflushing liquid into contact with the mass of particles to be consolidated in the subterranean location at a rate and volume such that the resin-forming solution enters the mass of particles before a significant proportion of partially cured resin is precipitated and is kept in contact with those particles until the selected amount of said partially cured resin has precipitated.

10. The process of claim 9 in which:

the concentration of polar organic components in the resin-forming solution is insufficient to keep a significant proportion of partially cured epoxy resin dissolved within the solution at the temperature of the subterranean location being treated;

the resin-forming solution contains a proportion within about 5 to 30% by volume of epoxy compound and curing agent such that when the solution is kept at the temperature of the subterranean location being treated, it subsequently precipitates a selected proportion of partially cured epoxy resin; and the resin-forming fluid is flowed into contact with a mass of particles to be cured in the subterranean location and kept in contact with them until such a precipitation occurs.

11. The process of claim 9 in which:

the concentration of polar organic compounds in the resin-forming solution is sufficient to keep partially cured epoxy resin in solution but insufficient to impart an immiscibility to the predominantly aliphatic hydrocarbon overflushing liquid;

the resin-forming solution contains a proportion which is from about 40 to 90% by volume dissolved epoxy compound and curing agent and is such that, at the reservoir temperature, the solvent is miscible with the predominantly aliphatic hydrocarbon overflushing liquid but the partially cured epoxy resin dissolved in the resin-forming solution is immiscible with the mixture of that solution and the overflushing liquid; and the resin-forming fluid is flowed into contact with a mass of particles to be consolidated in the subterranean location being treated and said mass is overflushed with the overflushing liquid.

* * * * *